(12) United States Patent
Schachter et al.

(10) Patent No.: US 11,637,852 B2
(45) Date of Patent: Apr. 25, 2023

(54) INTERNET-FACING DEVICE IDENTIFICATION

(71) Applicant: MICROSOFT TECHNOLOGY LICENSING, LLC, Redmond, WA (US)

(72) Inventors: Lior Menachem Schachter, Tel Aviv (IL); Dor Goldbaum, Ramat Gan (IL); Yoav Yassour, Zikhron Yaakov (IL); Haim Goldshtein, Yoqneam illit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/141,184

(22) Filed: Jan. 4, 2021

(65) Prior Publication Data

US 2022/0217116 A1 Jul. 7, 2022

(51) Int. Cl.
*H04L 9/40* (2022.01)
*H04L 61/5046* (2022.01)
(Continued)

(52) U.S. Cl.
CPC .......... *H04L 63/1433* (2013.01); *H04L 41/12* (2013.01); *H04L 43/065* (2013.01);
(Continued)

(58) Field of Classification Search
CPC ........ G06F 21/50; G06F 21/55; G06F 21/552; G06F 21/544; G06F 21/577;
(Continued)

(56) References Cited

U.S. PATENT DOCUMENTS 6,490,617 B1 * 12/2002 Hemphill ................ H04L 41/12
709/223
9,998,560 B2 6/2018 Wendt
(Continued)

FOREIGN PATENT DOCUMENTS

WO 2006012610 A2 2/2006

OTHER PUBLICATIONS

"An Internet Explorer or Edge window opens when your computer connects to a corporate network or a public network", Retrieved from: https://support.microsoft.com/en-us/help/4494446/an-internet-explorer-or-edge-window-opens-when-your-computer-, connects#:~:text=If%20the%20network%20requires%20credentials,as%20Internet%20Explorer%20or%20Edge).&text=Because%20the%20network%20does%20not,appears%20in%20the%20Task%20Bar, Retrieved Date: Aug. 1, 2020, 7 Pages.
(Continued)

*Primary Examiner* — Vivek Srivastava
*Assistant Examiner* — William C McBeth
(74) *Attorney, Agent, or Firm* — Shook, Hardy & Bacon L.L.P.

(57) ABSTRACT

Technology described herein determines whether a device is Internet facing. An Internet facing device is a device where traffic coming from the Internet is routable to the device. The technology described herein may comprise two components that work together to identify Internet-facing devices. The first component is a monitoring agent installed on organizational devices. The second component is an Internet-facing management service, which may be cloud based. The monitoring agent communicates connection-event notices to the Internet-facing management service. The source IP address in the connection-event notice is compared to a list of organizational IP addresses. If the source IP address is not on the list, then the computing device associated with the
(Continued)

notice is added to a list of Internet-facing devices because the connection originated from the Internet. Software listed in the connection-event notice may be added to a list of internet-facing software instances.

20 Claims, 6 Drawing Sheets

(51) Int. Cl.
| | |
|---|---|
| *H04L 41/12* | (2022.01) |
| *H04L 43/065* | (2022.01) |
| *H04L 43/00* | (2022.01) |
| *H04L 61/256* | (2022.01) |
| *H04L 101/668* | (2022.01) |
| *H04L 101/622* | (2022.01) |

(52) U.S. Cl.
CPC .......... *H04L 43/14* (2013.01); *H04L 61/2571* (2013.01); *H04L 61/5046* (2022.05); *H04L 2101/622* (2022.05); *H04L 2101/668* (2022.05)

(58) Field of Classification Search
CPC ....... G06F 21/554; G06F 21/57; H04L 41/12; H04L 43/04; H04L 43/045; H04L 43/065; H04L 43/14; H04L 61/2046; H04L 61/2517; H04L 61/6022; H04L 61/6068; H04L 63/1408; H04L 63/1416; H04L 63/1425; H04L 63/1433; H04L 63/20
See application file for complete search history.

(56) References Cited

U.S. PATENT DOCUMENTS

| | | | |
|---|---|---|---|
| 10,171,318 B2 | 1/2019 | Pon et al. | |
| 10,440,047 B2 | 10/2019 | Vervier et al. | |
| 10,791,140 B1 | 9/2020 | Dahlberg et al. | |
| 11,070,579 B1* | 7/2021 | Kiernan | H04L 63/1433 |
| 2008/0066145 A1* | 3/2008 | Molen | H04L 63/20 726/1 |
| 2014/0173739 A1* | 6/2014 | Ahuja | H04L 63/1416 726/25 |
| 2015/0013005 A1* | 1/2015 | Yamada | H04L 63/1416 726/22 |
| 2015/0127607 A1 | 5/2015 | Marshall et al. | |
| 2015/0310215 A1* | 10/2015 | McBride | G06F 21/577 726/25 |
| 2016/0006749 A1* | 1/2016 | Cohen | H04L 63/1425 726/23 |
| 2017/0310559 A1* | 10/2017 | Jain | H04L 41/26 |
| 2018/0337941 A1 | 11/2018 | Kraning et al. | |
| 2018/0375894 A1* | 12/2018 | Vervier | H04L 63/1433 |
| 2019/0199688 A1 | 6/2019 | Wallace et al. | |
| 2019/0297113 A1* | 9/2019 | Yang | H04L 63/1433 |
| 2019/0306011 A1* | 10/2019 | Fenoglio | H04L 43/04 |
| 2020/0057667 A1 | 2/2020 | Ramachandran et al. | |
| 2020/0057850 A1* | 2/2020 | Kraus | H04L 63/1416 |
| 2020/0169473 A1* | 5/2020 | Rimar | H04L 41/22 |
| 2020/0314134 A1* | 10/2020 | Izrael | H04L 63/1433 |
| 2021/0084004 A1* | 3/2021 | Vijayvargiya | H04L 63/1425 |
| 2021/0084079 A1* | 3/2021 | Di Mattia | H04L 63/1441 |
| 2021/0250365 A1* | 8/2021 | Atkinson | H04L 63/1425 |

OTHER PUBLICATIONS

"Network Security Baseline", Retrieved from: https://www.cisco.com/c/en/us/td/docs/solutions/Enterprise/Security/Baseline_Security/securebasebook.pdf, Retrieved Date: Aug. 1, 2020, 184 Pages.

"Telemetry-Based Infrastructure Device Integrity Monitoring", Retrieved from: https://tools.cisco.com/security/center/resources/network_integrity_monitoring.html#8, Jul. 7, 2014, 10 Pages.

"What is an Easy Way to Discover all of my External Facing Systems?", Retrieved from: https://resources.securitycompass.com/blog/what-is-an-easy-way-to-discover-all-of-my-external-facing-systems-2, Retrieved Date: Aug. 1, 2020, 7 Pages.

Abraham, Pronamika, "Automatically Identify Internet-Facing Assets", Retrieved from: https://notifications.qualys.com/product/2020/06/24/automatically-identify-internet-facing-assets, Jun. 24, 2020, 6 pages.

Satran, et al., "The Role of NLA", Retrieved from: https://docs.microsoft.com/en-us/windows/win32/winsock/the-role-of-nla-2. May 31, 2018, 2 Pages.

Shaw, Christine, "How to Recognize Malicious Network and Port Scanning", Retrieved from: https://www.extrahop.com/company/blog/2016/how-to-recognize-malicious-network-scanning-port-scanning/, Retrieved Date: Aug. 1, 2020, 7 Pages.

Tilbury, Chad, "Reconnaissance Detection (Blue Team)", Retrieved from: https://www.crowdstrike.com/blog/reconnaissance-detection-blue-team/, Mar. 19, 2016, 7 Pages.

Valites, Matthew, "Go with the Flow—Network Telemetry (VPC Data) in AWS", Retrieved from: https://www.splunk.com/en_us/blog/security/go-with-the-flow-network-telemetry-vpc-data-in-aws.html, Sep. 24, 2018, 14 Pages.

"International Search Report and Written Opinion Issued in PCT Application No. PCT/US21/057545", dated Mar. 1, 2022, 9 Pages.

\* cited by examiner

INTERNET-FACING DEVICE IDENTIFICATION

CROSS REFERENCE TO RELATED APPLICATIONS

Background

The Internet facilitates communication between computers all over the world. Unfortunately, this connectivity provides a means for bad actors to attempt unauthorized access to an organization's computer network. Organizations employ security measures to prevent unauthorized access. Organizations may pay special attention to Internet facing devices within the organization, since attacks from the Internet will come through these devices. However, tracking an organization's Internet facing devices is not a trivial task. Existing technology for identifying Internet facing devices within an organization are inefficient and unreliable. The existing techniques include scanning internal network traffic and external scanning. These are both resource intensive methods that may also fail to adequately identify an Internet facing device in some circumstances.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein more accurately identifies Internet-facing devices within an organization (e.g., a corporation, charitable organization, school, government entity). Organizations have both Internet-facing devices and non-Internet facing devices. An Internet facing device is a device where traffic coming from the Internet is routable to the device. These two classes of devices may be treated differently for security purposes or other reasons and it is desirable to maintain an accurate list of Internet-facing devices within an organization.

At a very high level, the technology described herein may comprise two components that work together to identify Internet-facing devices. The first component is a monitoring agent installed on organization's devices. The second component is an Internet-facing management service, which may be cloud based. The monitoring agent provides identification information for a device on which it is running along with connection-event notices. Because the monitoring agent is installed on the computing device, it is able to provide more accurate identification information for the device than existing solutions that identify Internet-facing devices, such as network scanning and external exploration technologies. The existing technologies are limited to identifying a device based on information contained in a data packet, such as an IP address, which is a less reliable way to identify a device because some device's IP address will change or be shared.

The monitoring agent may be installed on any computing device capable of executing code. In some aspects, the monitoring agent may run on a subset of the organization's devices, such as servers and user devices. The monitoring agent looks at network connections on the device and generates a connection-event notice when the connection meets a criteria. The criteria can include whether the source IP address for a connection is a public IP address. A connection with a private source IP address may not provide useful information because it is likely originating within an organization's network, rather than the Internet. Connections originating on the Internet should have a public source IP address. Thus, aspects of the technology described herein may generate events only when the source IP address is a public IP address. The goal of the second criteria is to identify connections that originate at a device other than the computing device on which the monitoring agent is running. The second criteria compares the source IP address for a connection to IP addresses associated with the device on which the monitoring agent is installed. If the source IP address is not assigned to the device on which the monitoring agent is installed, then a connection-event notice is generated.

The connection-event notice is communicated to the Internet-facing device management service. The connection-event notice may include the source IP address, target IP address, device port on which the connection operates, process on machine that is being exposed to the Internet (e.g., opened the connection), the entire command line that is listening to the connection, and the like.

The Internet-facing device management service receives both connection-event notices and agent-status reports. As mentioned, the agent-status reports identify IP addresses associated with the device on which the agent is running. The IP addresses may be extracted from the agent-status reports and entered into an organizational IP address store. The organization IP address store records IP addresses associated with the organization as indicated on the agent-status reports. In aspects, the organization IP address store can also be supplemented with additional IP addresses known to be associated with the organization.

The Internet-facing device management service compares the source IP address identified in a connection-event notice with organizational IP addresses recorded in the organizational IP address store. If the source IP address is not an organizational IP address, then the device associated with the connection-event notice is added to a record of Internet-facing devices. In an aspect, software instances that use the connection are added to a list of Internet-facing software instances. The software instance can be identified in the connection-event notice. As mentioned, the connection-event notice can list any software instances that opened the connection or are otherwise communicating over the connection.

The list of Internet-facing software instances and Internet-facing devices can be used to improve security within an organization. For example, when a patch is received for a software having Internet-facing software instances, the patch may be rolled out to these instances first. Similar prioritization could be given to Internet-facing devices when performing maintenance, updates, security checks, or other management tasks.

BRIEF DESCRIPTION OF THE DRAWINGS

Aspects of the invention are described in detail below with reference to the attached drawing figures, wherein.

DETAILED DESCRIPTION

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein more accurately identifies Internet-facing devices within an organization (e.g., a corporation, charitable organization, school, government entity). Organizations have both Internet-facing devices and non-Internet facing devices. An Internet facing device is a device where traffic coming from the Internet is routable to the device. These two classes of devices may be treated differently for security purposes or other reasons and it is desirable to maintain an accurate list of Internet-facing devices within an organization.

At a very high level, the technology described herein comprises two components that work together to identify Internet-facing devices. The first component is a monitoring agent installed on the organization's devices. The second component is an Internet-facing management service, which may be cloud based. The monitoring agent provides identification information for a device on which it is running along with connection-event notices. Because the monitoring agent is installed on the computing device, it is able to provide more accurate identification information for the device than existing solutions that find Internet-facing devices, such as network scanning and external exploration technologies.

The technology described herein significantly reduces the amount of network resources (e.g., bandwidth) used to identify Internet facing devices within an organization when compared to existing methods of identifying Internet facing devices. For example, one current method of identifying Internet facing devices periodically scans network traffic within an organization's network and mirrors the traffic to an analysis tool. The analysis tool analyzes all of the networked traffic and identifies Internet facing devices. Mirroring a large amount of network traffic is resource intensive and can significantly impact network performance while the mirroring is ongoing. In contrast, the present technology uses a monitoring agent on each device to generate connection-events that indicate the device on which it is installed is possibly Internet facing. Most devices in an organization are not Internet facing, so only a few connection-event notices should be generated. With the technology described herein, the monitoring occurs on the devices receiving traffic, which eliminates the need to mirror the traffic to a separate device for analysis. The bandwidth used by the technology described herein for connection-event notices is minimal compared to a mirroring operation. In aspects, the technology described herein does not mirror an organization's network traffic.

The technology described herein also saves resources when compared to a second currently available technology for identifying Internet facing devices in an organization, which attempts to connect to each device from outside the organization network. If a connection is formed, then the connected-to device is designated Internet facing, otherwise it is designated as not Internet facing. This technique requires a message attempting to initiate a communication session be sent to each device, most of which will not be Internet facing. In contrast, the technology described herein sends connection-event notices from machines that are Internet facing based on communications received in the course of normal use. Thus, the technology described herein does not need to generate any "test" communications or other artificial attempts to set up a communication session. The technology described herein uses only "normal" traffic and does not generate extra traffic through attempts to connect to devices from outside the network for the specific purpose of identifying Internet facing devices.

The monitoring agent of the technology described herein is also able to generate more detailed information about an organization's Internet facing devices. Typically, only IP addresses and DNS addresses can be extracted through the traffic analysis used in the presently available technologies. In contrast to existing technology, the technology described herein can generate unique identification for devices. For example, a device may be identified with its Globally Unique Identifier ("GUID") or Universally Unique Identifier ("UUID") depending on the operating environment. Other identification information that may be used includes a media access control ("MAC") address and fully qualified domain name. While these are known ways to identify a device, existing technology for identifying Internet-facing devices does not have access to this information because the technologies do not have direct access to the organization's devices. The existing technologies are limited to identifying a device based on information contained in a data packet, such as an IP address, which is a less reliable way to identify a device because some device's IP address will change or be shared.

The monitoring agent may be installed on any computing device capable of executing code. In some aspects, the monitoring agent may run on a subset of organization's devices, such as servers and user devices. The monitoring agent looks at network connections on the device and generates a connection-event notice when the connection meets a criteria. The criteria can include whether the source IP address for a connection is a public IP address. If it is private and not public, then a connection-event notice may not be generated. As mentioned, a goal of the technology is to identify Internet-facing devices. A connection with a private source IP address may not provide useful information because it is likely originating within an organization's network, rather than the Internet. Connections originating on the Internet should have a public source IP address. Thus, aspects of the technology described herein may generate events only when the source IP address is a public IP address. Generating connection-event notices only when the source IP address is public can provide improved efficiency over methods that mirror all connections or generate reports for all connections.

The goal of the second criteria is to identify connections that originate at a device other than the computing device on which the monitoring agent is running. The second criteria compares the source IP address to IP addresses associated with the device on which the monitoring agent is installed. If the source IP address is not assigned to the device on which the monitoring agent is installed, then a connection-event notice is generated.

The connection-event notice is communicated to the Internet-facing device management service. The connection-event notice may include the source IP address, target IP address, device port on which the connection operates, software or process on machine that is being exposed to the Internet (e.g., opened the connection), the entire command line that is listening to the connection, and the like. In one aspect, the connection is a Transmission Control Protocol and the Internet Protocol ("TCP/IP") or a User Datagram Protocol ("UDP") connection.

The Internet-facing device management service receives both connection-event notices and agent-status reports. As mentioned, the agent-status reports identify IP addresses associated with the device on which the agent is running. The IP addresses may be extracted from the agent-status reports and entered into an organizational IP address store. The organizational IP address store records IP addresses associated with the organization as indicated on the agent-status reports. In aspects, the organizational IP address store can also be supplemented with additional IP addresses known to be associated with the organization.

The Internet-facing device management service compares the source IP address identified in a connection-event notice with organizational IP addresses recorded in the organizational IP address store. If the source IP address is not an organizational IP address, then the device associated with the connection-event notice is added to a record of Internet-facing devices. In an aspect, software instances that use the connection are added to a list of Internet-facing software instances. The software instance can be identified in the connection-event notice. As mentioned, the connection-event notice can list any software instances that opened the connection or are otherwise communicating over the connection.

The list of Internet-facing software instances and Internet-facing devices can be used to improve security within an organization. For example, when a patch is received for a software having Internet-facing software instances, the patch may be rolled out to these instances first. Similar prioritization could be given to Internet-facing devices when performing maintenance, updates, security checks, or other management tasks.

As used herein, a public IP address is addressable on the Internet. In one aspect, a public IP address is any address outside of a range designated as private.

As used herein, a private IP address is not addressable on the Internet, but may be used within a local network. Devices associated with private IP address may still access the Internet. In one aspect, a private IP address is any address inside a range designated by a governing body as private. According to standards set forth in Internet Engineering Task Force (IETF) document RFC-1918, the following IPv4 address ranges are reserved for private internets, and are not publicly routable on the global internet: 10.0.0.0-10.255.255.255; 172.16.0.0-172.31.255.255; and 192.168.0.0-192.168.255.255.

Figure 1:
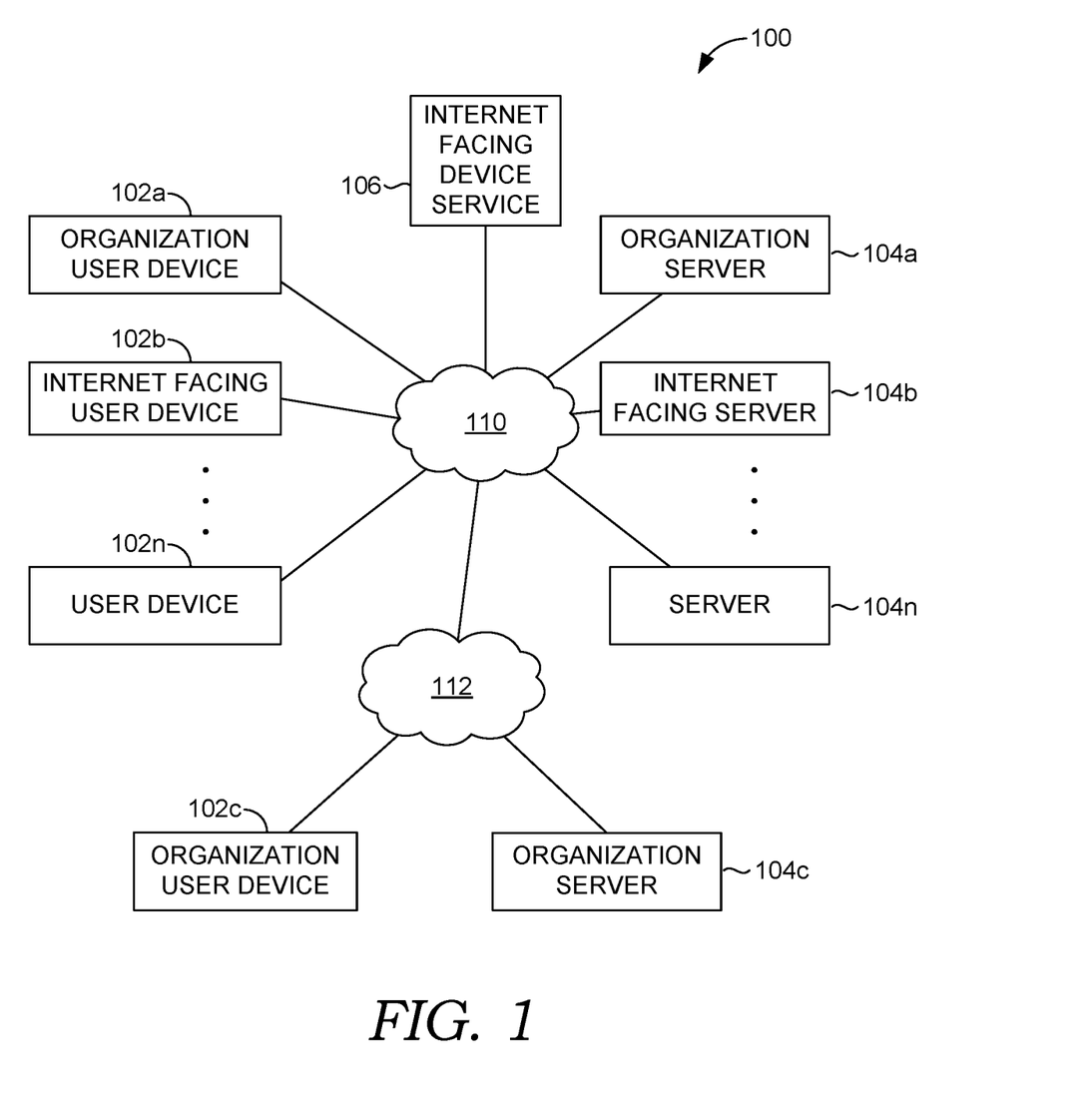
FIG. 1 is a block diagram of an example operating environment suitable for implementing aspects of the technology.

Turning now to FIG. 1, a block diagram is provided showing an operating environment 100 in which aspects of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a, 102b, and 102c through 102n; a number of servers, such as servers 104a, 104b, and 104c through 104n; Internet facing device management server 106; network 110; and organizational network 112. It should be understood that environment 100 shown in FIG. 1 is an example of one suitable operating environment. Each of the components shown in FIG. 1 may be implemented via any type of computing device, such as computing device 600, described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks. Organizational network 112 may include, without limitation, one or more local area networks (LANs) and/or wide area networks (WANs). Organization network 112 connects organization computing devices (e.g., user device 102c and server 106c) with each other and may facilitate connections to other devices associated with the organization or outside of the organization, for example, through network 110. The Organization network 112 may be controlled directly or indirectly by an organization for its own use. The organization network 112 may allow devices on the network 112 to discover and communicate with each other, while excluding devices from outside the organization network 112 from the same discovery and communication. Access to the organization network 112 may be guarded with various security mechanisms, such as a firewall.

It should be understood that any number of user devices and servers may be employed within operating environment 100 within the scope of the present disclosure. Each may comprise a single device or multiple devices cooperating in a distributed environment. For instance, Internet facing device management server 106 may be provided via multiple devices arranged in a distributed environment that collectively provide the functionality described herein. Additionally, other components not shown may also be included within the distributed environment.

User devices 102a, 102b, and 102c through 102n can be client devices on the client-side of operating environment 100, while Internet facing device management server 106, and servers 104a, 104b, and 104c through 104n can be on the server-side of operating environment 100. Server 106 can comprise server-side software designed to work in conjunction with client-side software (e.g., monitoring agent) on user devices 102a, 102b, and 102c through 102n and servers 104a, 104b, and 104c through 104n so as to implement any combination of the features and functionalities discussed in the present disclosure. Some of servers 104a, 104b, and 104c through 104n may be the organization's devices and some may be non-organization devices.

Similarly, some of user devices 102a, 102b, and 102c through 102n may be the organization's devices and some may be non-organization devices. FIG. 1 shows that user device 102a and 102c are organization, while servers 104a and 104c are organization servers. Notice that organization devices can be connected directly to network 110 (which can include the Internet), for example, by an employee (e.g., using user device 102a) working from home or to organization network 112 (e.g., user device 102c).

A goal of the technology described herein is to identify Internet facing devices, both user devices and servers, within the organization. This is achieved, in part, by detecting when a device from outside the organization initiates a connection to an organization's device. Though not shown, the devices from environment 100 associated with the organization may have a monitoring agent installed. This division of operating environment 100 is provided to illustrate one example of a suitable environment, and there is no requirement for each implementation that any combination of search server 106, servers 104a, 104b, and 104c through 104n, and user devices 102a, 102b, and 102c through 102n remain as separate entities. The monitoring agent on the organization's servers and user devices can communicate status reports and connection-event notices to the Internet facing device management server 106.

User devices 102a, 102b, and 102c through 102n may comprise any type of computing device capable of use by a user. For example, in one aspect, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user may be associated with one or more user devices. The user may communicate with server 106, servers 104a, 104b, and 104c through 104n, through the user devices.

Each of these devices may be associated with an IP address that is either private or public. The Internet facing devices (e.g., user device 102b and server 104b) will typically be associated with public IP addresses, while all others will be assigned private IP addresses. As described previously, the following IPv4 address ranges are reserved for private internets, and are not publicly routable on the global internet: 10.0.0.0-10.255.255.255; 172.16.0.0-172.31.255.255; and 192.168.0.0-192.168.255.255.

Figure 2:
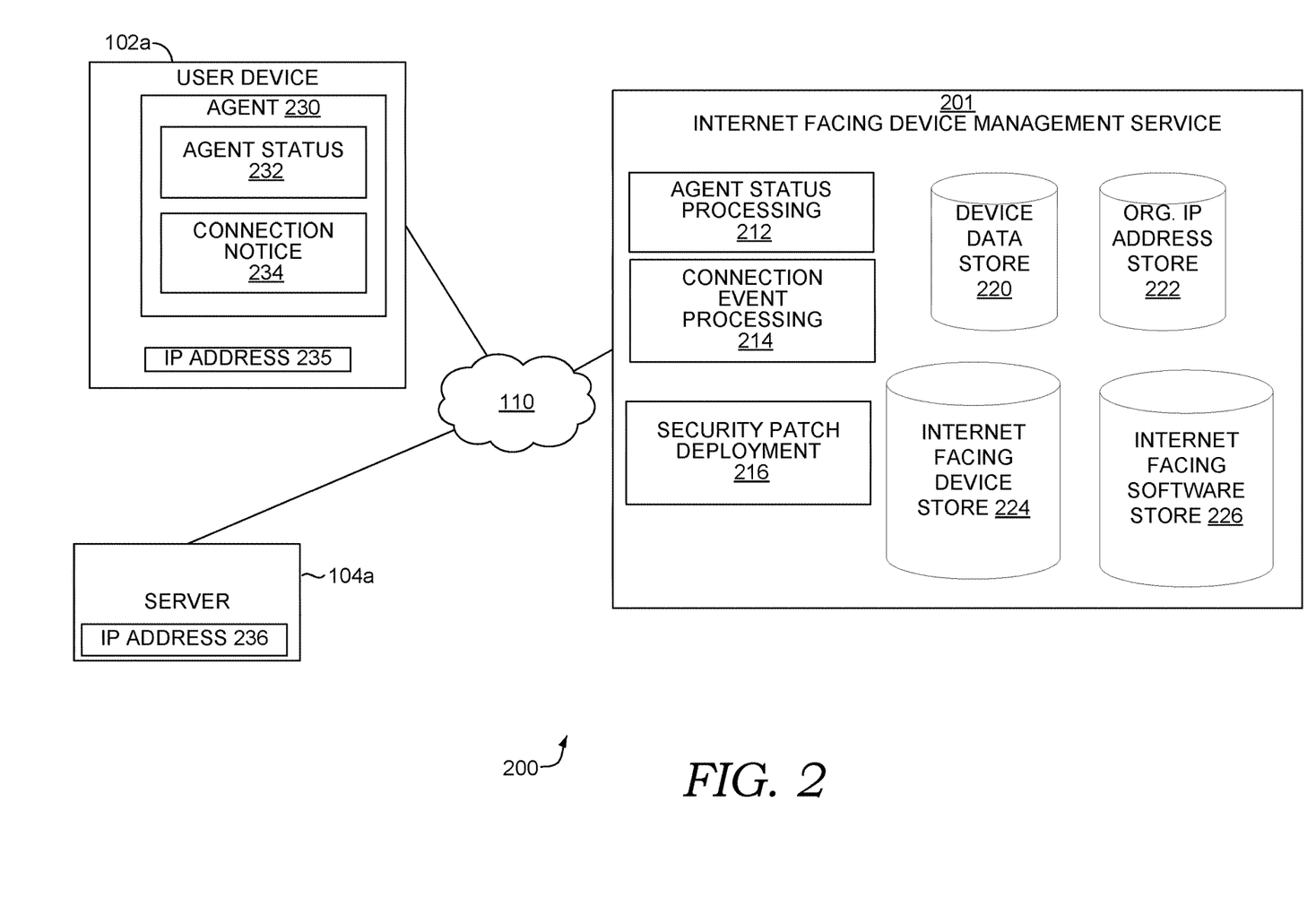
FIG. 2 is a diagram showing an Internet facing device management service, according to an aspect of the technology described herein.

Operating environment 100 can be utilized to implement one or more of the components of system 200, described in FIG. 2, including components for managing Internet facing computing devices.

Referring now to FIG. 2, with FIG. 1, a block diagram is provided showing aspects of an example computing system architecture suitable for implementing an aspect of the technology and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

At a high level, system 200 comprises Internet-facing device management service 201 that identifies organizational devices that are Internet facing. For the sake of illustration, the user device 102a is an organizational device and the server 104a is a non-organizational device. The server 104a is associated with IP address 236. The Internet-facing device management service 201 may be embodied on one or more servers, such as Internet-facing device management server 106. This is a simplified environment. In a real word scenario, an organization could have many devices. Only a single outside the organization device is shown for the sake of simplicity, but in a real world scenario, many could be present.

Example system 200 includes the Internet-facing device management service 201. The Internet-facing device management service 201 (and its components) may be embodied as a set of compiled computer instructions or functions, program modules, computer software services, or an arrangement of processes carried out on one or more computer systems, such as computing device 600 described in connection to FIG. 6, for example.

In one aspect, the functions performed by components of system 200 are associated with one or more applications, services, or routines. In particular, such applications, services, or routines may operate on one or more user devices (such as user device 102a), servers (such as Internet-facing device management server 106), may be distributed across one or more user devices and servers, or be implemented in the cloud. Moreover, in some aspects, these components of system 200 may be distributed across a network, including one or more servers (such as server 106) and client devices (such as user device 102a), in the cloud, or may reside on a user device such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects, functionality of these components can be shared or distributed across other components.

The user device 102a comprises monitoring agent 230, which comprises an agent-status component 232 and a connection-event notice component 234. User device 102a is associated with IP address 235 and may also be associated with other identification information, such as a GUID (not shown).

The monitoring agent 230 runs on user device 102a. Similar monitoring agents may run on other computing devices associated with the organization. The monitoring agent 230 may perform other functions in addition to those described herein. Monitoring agent 230 provides updated identification information for the computing device to the Internet-facing device management service 201. The monitoring agent 230 also provides connection-event notices upon detecting irrelevant connection to the computing device.

The agent-status component 232 provides identification information and IP address 235 information for the computing device to the Internet-facing device management service 201. This information may be provided in agent-status reports. An agent-status report may be provided upon first installing the monitoring agent on the computing device. Additional notices may be provided periodically (e.g., monthly, weekly) or triggered in response to detecting a change. For example, a detected addition or subtraction to the IP addresses associated with the computing device may trigger an agent-status report that includes the updated list of IP addresses. As explained herein, the Internet-facing device management service 201 processes agent-status reports to generate a current list of IP addresses associated with an organization. The agent-status reports may also be used to generate a current list of computing devices within the organization that are associated with monitoring agents.

The connection-event notice component 234 generates a connection-event notice upon detecting a connection that satisfies event generation criteria. In one aspect, the connection is a Transmission Control Protocol and the Internet Protocol ("TCP/IP") or a User Datagram Protocol ("UDP") connection, but other connection types may also be monitored. The event generation criteria can include determining that the source IP address associated with a connection is a public IP address. For example, a communication originating with server 104*a* will be associated with IP address 236. As mentioned, a goal of the technology is to identify Internet-facing devices. A connection with a private source IP address may not provide useful information because it is likely originating within an organization's network, rather than the Internet. Connections originating on the Internet should have a public source IP address. Thus, aspects of the technology described herein may generate events only when the source IP address is a public IP address. Generating connection-event notices only when the source IP address is public can provide improved efficiency over methods that mirror all connections or generate reports for all connections.

The second event generation criteria identifies incoming connections. Incoming connections originate at a different computing device and have a source IP address associated with the different computing device. Thus, the second event generation criteria may be that the source IP address is not associated with the computing device on which the monitoring agent is running, in this example user device 102*a*. If the source IP address was associated with the computing device on which the monitoring agent is running then the connection would have originated at the computing device. Such a connection is outgoing and does not help determine whether the computing device is addressable from the Internet, and thus Internet facing. In an aspect, connection-event notices are not generated for connections that originated on the computing device (e.g., outgoing connections).

The connection-event notices are communicated to the Internet-based device management service 201. The convention-event notice can include detailed connection information and detailed identification information for the computing device from which the connection-event notice originated. The connection information can include the source IP address, target IP address, device port on which the connection operates, software instance or process on machine that is being exposed to the Internet (e.g., opened the connection), the entire command line that is listening to the connection, and the like. The identification information can include the computing device's Globally Unique Identifier ("GUID") or Universally Unique Identifier ("UUID") depending on the operating environment. Other identification information that may be used includes a media access control ("MAC") address and fully qualified domain name. While these are known ways to identify a device, existing technology for identifying Internet-facing devices do not have access to this information because the technologies do not have direct access to the organization's device. The monitoring agent 230 is running on the computing device and can provide detailed information about the device and the connection that is not available to other method used to identify Internet-facing devices.

The Internet-facing device management service 201 comprises an agent-status processing component 212, a connection-event processing component 214, and a security-patch deployment component 216. The Internet-facing device management service 201 comprises organizational device data store 220, organizational IP address data store 222, organizational Internet-facing device data store 224, and organizational Internet-facing software data store 226.

The agent-status processing component 212 receives agent-status reports and processes them. The agent-status report can include detailed identification information for the computing device from which the notice originated. This identification information includes IP addresses, possibly including subnets, assigned to the computing device. The IP addresses received from computing devices within the organization are used to build a data store of IP addresses associated with the organization.

The agent-status processing component 212 can extract an IP address from the notice and determine whether the IP address is already listed in the organization IP address store 222. If it is already listed, then in one aspect no further action may be taken. In another aspect, the computing device associated with the IP address in the organization IP address store 222 is confirmed to be the computing device associated with the notice. If a different computing device is associated with the IP address in the data store, then the record is updated to associate the IP address with the computing device from which the agent-status report was received. The updated record may list both computing devices associated with the IP address or replace the previously listed computing device with the computing device from which an agent-status report containing the IP address was most recently received.

The agent-status processing component 212 can add an IP address to the organizational IP address store 222 when an IP address in the agent-status update is not found in the organizational IP address store 222. As mentioned, the computing device from which the notice was received may be associated with the IP address in the organizational IP address store 222. The agent-status processing component 212 may also add identification information for computing devices to the device data store 220 when a device associated with the notice is not already in device data store 220. Similarly, if the identification information in an agent-status report differs from the information in the device data store 220 then the data store 220 may be updated.

The connection-event processing component 214 processes connection-event notices to determine whether the computing device associated with the connection-event notice is Internet facing. The connection-event processing component 214 first determines whether the source IP address indicated in a notice is associated with the organization. This determination can be made by comparing the source IP address to the list of organizational IP address is in the organizational IP address store 222. If the source IP address from the notice is not an organizational IP address, then the connection originated outside of the organization from the Internet. The computing device associated with the non-organizational source IP address is thus determined to be an Internet-facing device. Identification information for the computing device is then added to the Internet-facing device data store 224, if the computing device is not already listed in the data store 224.

The connection-event processing component 214 processes connection-event notices to determine whether the instances of software on the computing device associated with the connection-event notice is Internet facing. Not all software on an Internet-facing device is Internet facing. The software using the connection may be Internet-facing software instances. Software instances that are determined to be Internet-facing are added to a list of Internet-facing software instances. The Internet-facing software instance can be identified in the connection-event notice as using the connection. As mentioned, the connection-event notice can list any software instances that opened the connection or are otherwise communicating over the connection. Identification information for Internet-facing software instances can be added to the organizational Internet-facing software data store 226.

The security-patch deployment component 216 is an example of a component that can make use of the list of Internet-facing devices in organization. For example, when a patch is received for a software having Internet-facing software instances, the patch may be rolled out to these instances first. Similar prioritization could be given to Internet-facing devices when performing maintenance, updates, security checks, or other management tasks.

The organizational device data store 220 stores a record of devices associated with the organization. Each device record can include detailed identification information including the computing device's Globally Unique Identifier ("GUID") or Universally Unique ide ("UUID") depending on the operating environment. Other identification information that may be used includes a media access control ("MAC") address and fully qualified domain name. The organizational device data store 220 may be populated with information received in agent-status reports and/or connection-event notices.

The organizational IP address store 222 stores IP addresses associated with the organization. As described previously, these addresses may be extracted from agent-status reports. In aspects, IP addresses may also be added to the IP address store 222 through other methods.

The organizational Internet-facing device data store 224 includes a list of Internet-facing devices associated with the organization. As described previously, the listed devices are updated in response to processing connection-event notices.

The organizational Internet-facing software data store 226 includes a list of Internet-facing software instances associated with the organization. The software instance may be identified using identification information for the computing device on which the software instance runs. As described previously, the listed software instances are updated in response to processing connection-event notices.

Exemplary Methods

Figure 3:
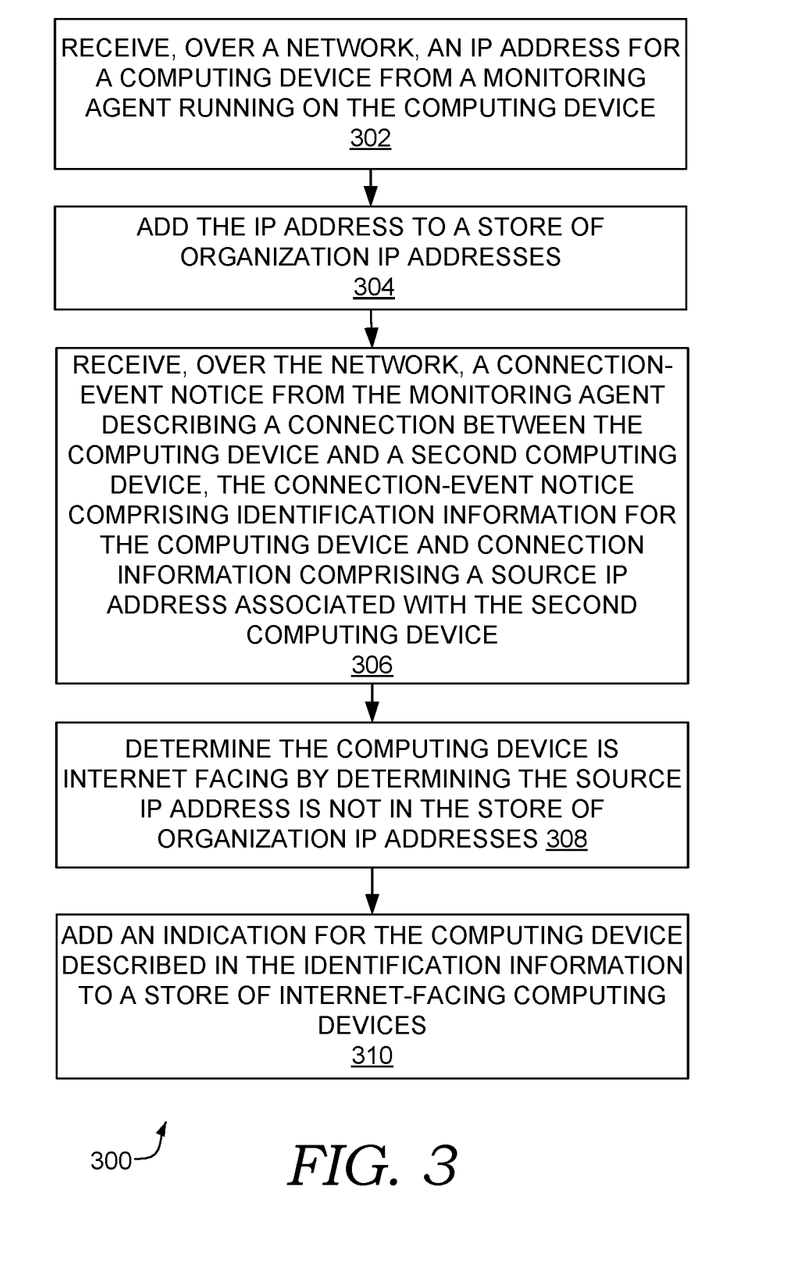
FIGS. 3-5 are an exemplary process flow diagram showing a method of identifying Internet facing computing devices in an organization, according to an aspect of the technology described herein.
Figure 4:
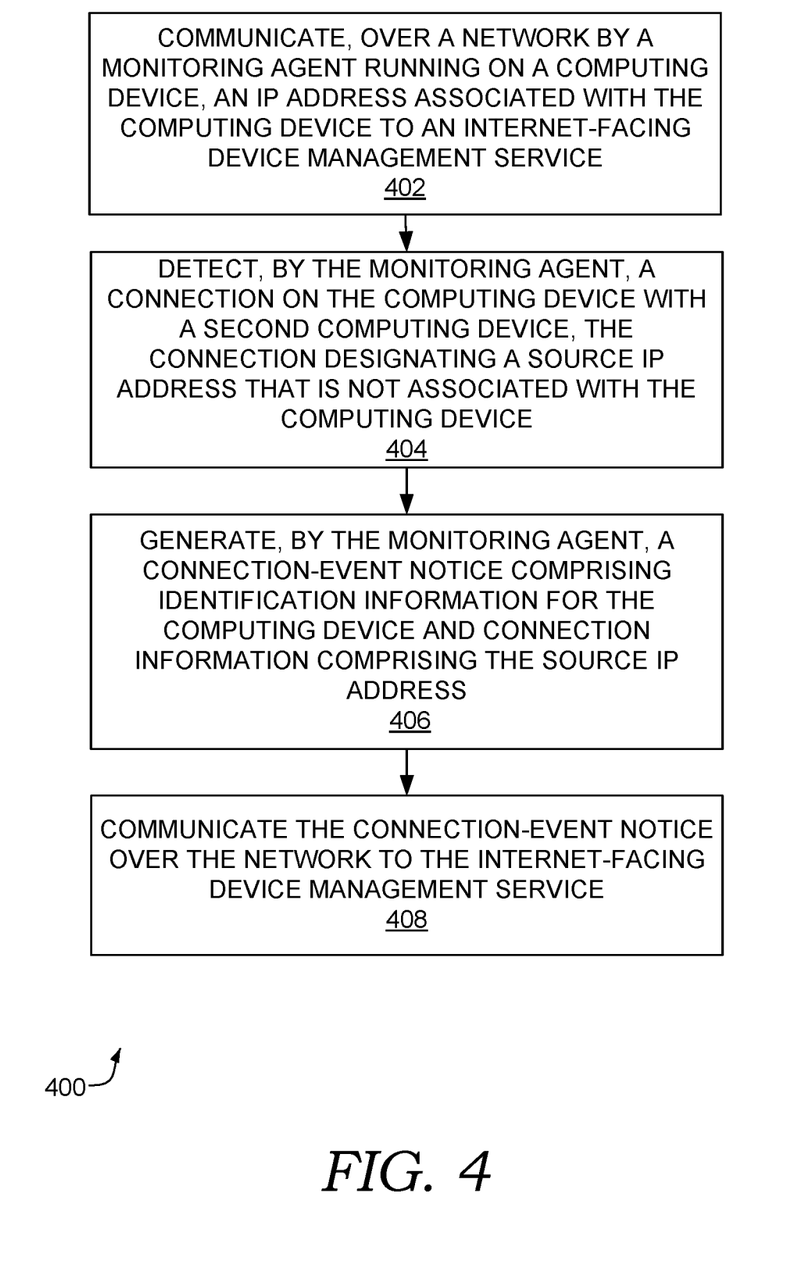
Figure 5:
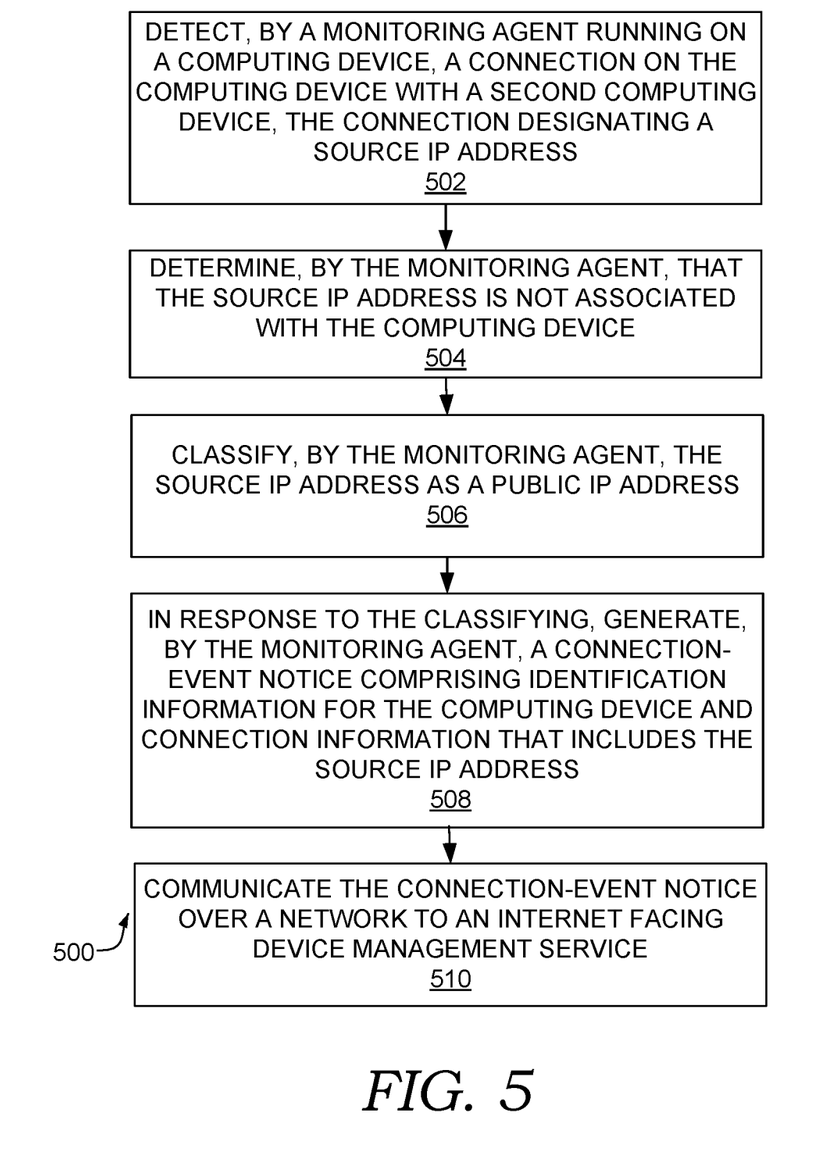

Now referring to FIGS. 3-5, each block of methods 300, 400, and 500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (stand-alone or in combination with another hosted service), or a plug-in to another product, to name a few. In addition, methods 300, 400, and 500 are described, by way of example, with respect to the environment 200 of FIG. 2. However, these methods may additionally or alternatively be executed by any one system, or any combination of systems, including, but not limited to, those described herein.

Turning now to FIG. 3, a flow chart showing a method 300 of identifying Internet facing computing devices in an organization is provided, in accordance with an aspect of the technology described herein.

The method 300, at block 302 includes receiving, over a network, an IP address for a computing device from a monitoring agent running on the computing device. The computing device may be associated with an organization that is attempting to identify all of its Internet facing devices. In one aspect, a monitoring agent is installed on a large percentage of an organization's devices. Each monitoring agent may provide information for the computing device on which it is running. The IP address may be provided in an agent-status report. The agent-status report comprises an IP address associated with the computing device on which the monitoring agent is running and may include other identifying information for the computing device, such as a GUID.

The method 300, at block 304 includes adding the IP address to a store of organizational IP addresses. The IP address can be retrieved from the agent-status report. A determination is then made whether the IP address is already listed in the organization IP address store. If it is already listed, then in one aspect no further action may be taken. In another aspect, the computing device associated with the IP address in the organization IP address store is confirmed to match the computing device associated with the notice. The store can be updated if a mismatch is detected.

The method 300, at block 306 includes receiving, over the network, a connection-event notice from the monitoring agent describing a connection between the computing device and a second computing device. The connection-event notice comprises identification information for the computing device and connection information comprising a source IP address associated with the second computing device. The identification information can include the computing device's Globally Unique Identifier ("GUID") or Universally Unique Identifier ("UUID") depending on the operating environment. Other identification information that may be used includes a media access control ("MAC") address and fully qualified domain name. The connection information can include the source IP address, target IP address, device port on which the connection operates, process on machine that is being exposed to the Internet (e.g., opened the connection), the entire command line that is listening to the connection, and the like.

The method 300, at block 308 includes determining the computing device is Internet facing by determining the source IP address is not in the store of organizational IP addresses. This determination can be made by comparing the source IP address to the list of organizational IP address is in the organizational IP address store. If the source IP address from the notice is not an organizational IP address, then the connection originated outside of the organization from the Internet. The computing device associated with the notice reciting the non-organizational source IP address is thus determined to be an Internet-facing device. Identification for the computing device is then added to the Internet-facing device data store, if the computing device is not already listed in the Internet-facing device data store.

The method 300, at block 310 includes adding an indication the computing device described in the identification information to a store of Internet-facing computing devices. The indication can include the IP address, GUID, and/or other identifying information for the computing device.

Turning now to FIG. 4, a flow chart showing a method 400 of identifying Internet facing computing devices in an organization is provided, in accordance with an aspect of the technology described herein.

The method 400, at block 402 includes communicating, over a network by a monitoring agent running on a computing device, an IP address associated with the computing device to an Internet-facing device management service.

The method 400, at block 404 includes detecting, by the monitoring agent, a connection on the computing device with a second computing device. The connection designates a source IP address that is not associated with the computing device.

The method 400, at block 406 includes generating, by the monitoring agent, a connection-event notice comprising identification information for the computing device and connection information comprising the source IP address. The identification information can include the computing device's Globally Unique Identifier ("GUID") or Universally Unique identifier ("UUID") depending on the operating environment. Other identification information that may be used includes a media access control ("MAC") address and fully qualified domain name. The connection information can include the source IP address, target IP address, device port on which the connection operates, process on machine that is being exposed to the Internet (e.g., opened the connection), the entire command line that is listening to the connection, and the like.

In one aspect, the connection-event notice is generated upon detecting a connection that satisfies event generation criteria. In one aspect, the connection is a Transmission Control Protocol and the Internet Protocol ("TCP/IP") or a User Datagram Protocol ("UDP") connection, but other connection types may also be monitored. The event generation criteria can include determining that the source IP address associated with a connection is a public IP address. Connections originating on the Internet should have a public source IP address. Thus, aspects of the technology described herein may generate events only when the source IP address is a public IP address. A connection with a private source IP address may not provide useful information because it is likely originating within an organization's network, rather than the Internet.

The second event generation criteria identifies incoming connections. Incoming connections originate at a different computing device and have a source IP address associated with the different computing device. Thus, the second event generation criteria may be determining that the source IP address is not associated with the computing device on which the monitoring agent is running. In an aspect, connection-event notices are not generated for connections that originated on the computing device (e.g., outgoing connections).

The method 400, at block 408 includes communicating the connection-event notice over the network to the Internet-facing device management service.

Turning now to FIG. 5, a flow chart showing a method 500 of identifying Internet facing computing devices in an organization is provided, in accordance with an aspect of the technology described herein.

The method 500, at block 502 includes detecting, by a monitoring agent running on a computing device, a connection on the computing device with a second computing device, the connection designating a source IP address.

The method 500, at block 504 includes determining, by the monitoring agent, that the source IP address is not associated with the computing device. Incoming connections originate at a different computing device and have a source IP address associated with the different computing device, rather than the computing device being monitored.

The method 500, at block 506 includes classifying, by the monitoring agent, the source IP address as a public IP address. A source IP address can be classified as public by comparing it against a ranges defining private IP addresses. As mentioned, a goal of the technology is to identify Internet-facing devices. A connection with a private source IP address may not provide useful information because it is likely originating within an organization's network, rather than the Internet. Connections originating on the Internet should have a public source IP address. Thus, aspects of the technology described herein may generate events only when the source IP address is a public IP address.

The method 500, at block 508 includes in response to the classifying, generating, by the monitoring agent, a connection-event notice comprising identification information for the computing device and connection information that includes the source IP address. The identification information can include the computing device's Globally Unique Identifier ("GUID") or Universally Unique Identifier ("UUID") depending on the operating environment. Other identification information that may be used includes a media access control ("MAC") address and fully qualified domain name. The connection information can include the source IP address, target IP address, device port on which the connection operates, process on machine that is being exposed to the Internet (e.g., opened the connection), the entire command line that is listening to the connection, and the like.

In one aspect, the connection-event notice is generated upon detecting a connection that satisfies event generation criteria. In one aspect, the connection is a Transmission Control Protocol and the Internet Protocol ("TCP/IP") or a User Datagram Protocol ("UDP") connection, but other connection types may also be monitored. The event generation criteria can include determining that the source IP address associated with a connection is a public IP address. Connections originating on the Internet should have a public source IP address. Thus, aspects of the technology described herein may generate events only when the source IP address is a public IP address.

The second event generation criteria identifies incoming connections. Incoming connections originate at a different computing device and have a source IP address associated with the different computing device. Thus, the second event generation criteria may be determining that the source IP address is not associated with the computing device on which the monitoring agent is running. In an aspect, connection-event notices are not generated for connections that originated on the computing device (e.g., outgoing connections).

The method 500, at block 510 includes communicating the connection-event notice over a network to an Internet facing device management service.

Figure 6:
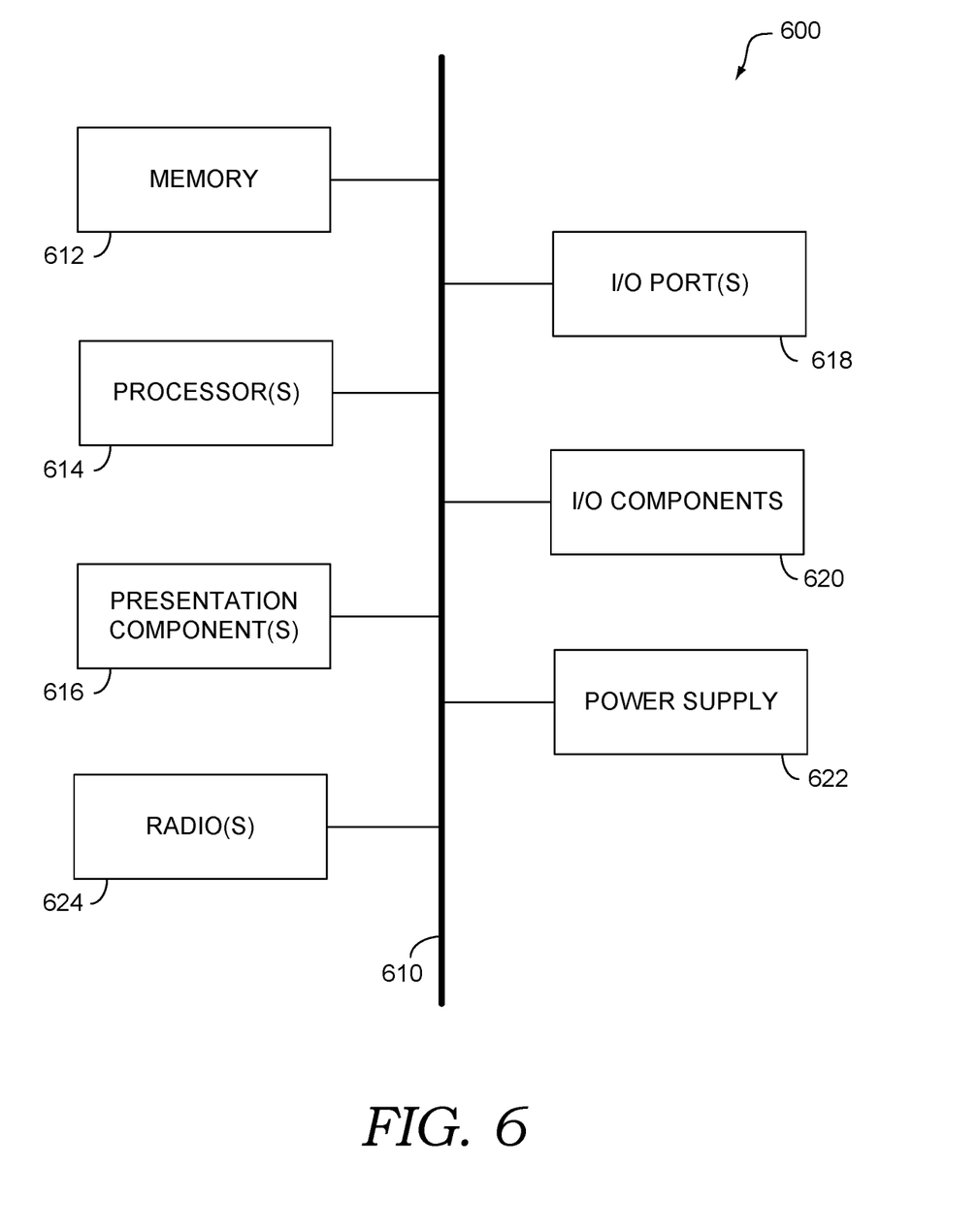
FIG. 6 is a block diagram of an exemplary computing environment suitable for use in implementing an aspect of the technology.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more aspects of the present technology. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc.

The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some aspects of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method of identifying Internet facing computing devices in an organization, the method comprising:

communicating, over a network by a monitoring agent running on a computing device, an IP address associated with the computing device to an Internet-facing device management service configured to add the IP address to a store of organization IP addresses;

detecting, by the monitoring agent, a connection on the computing device with a second computing device, the connection designating a source IP address that is not associated with the computing device;

generating, by the monitoring agent, a connection-event notice comprising identification information for the computing device and connection information comprising the source IP address;

communicating the connection-event notice over the network to the Internet-facing device management service; and identifying, by the Internet-facing device management service, the computing device as Internet facing by determining the source IP address is not in the store of organization IP addresses.

2. The method of claim 1, wherein the method further comprises classifying the source IP address as a public IP address and wherein the connection-event notice is generated in response to said classifying the source IP address as a public IP address.

3. The method of claim 1, wherein the identification information comprises a Globally Unique Identifier ("GUID") or Universally Unique Identifier ("UUID").

4. The method of claim 1, wherein the connection information comprises identification of a software application that participated in the connection.

5. The method of claim 1, wherein the identification information comprises a MAC address for the computing device.

6. The method of claim 1, wherein the connection information comprises identification of a command line that is listening on the connection.

7. The method of claim 1, wherein the connection information comprises a port on the computing device through which the connection was made.

8. The method of claim 1, wherein the connection information also comprises a subnet address.

9. A method of identifying Internet facing computing devices in an organization, the method comprising:

detecting, by a monitoring agent running on a computing device, a connection on the computing device with a second computing device, the connection designating a source IP address;

determining, by the monitoring agent, that the source IP address is not associated with the computing device;

classifying, by the monitoring agent, the source IP address as a public IP address;

in response to the classifying, generating, by the monitoring agent, a connection-event notice comprising identification information for the computing device and connection information that includes the source IP address; and communicating the connection-event notice over a network to an Internet facing device management service that identifies the computing device as Internet facing using the connection-event notice.

10. The method of claim 9, wherein the connection information comprises identification of a software application that participated in the connection.

11. The method of claim 9, wherein the connection information comprises a port on the computing device through which the connection was made.

12. The method of claim 9, wherein the identification information comprises a Globally Unique Identifier ("GUID") or Universally Unique Identifier ("UUID").

13. The method of claim 9, wherein the method further comprises communicating one or more IP addresses associated with the computing device and the identification information for the computing device to the Internet facing device management service.

14. A system comprising:

one or more hardware processors; and one or more computer-readable media having executable instructions for a monitoring agent embodied thereon, which, when executed by the one or more processors, cause the one or more hardware processors to execute actions comprising:

communicating, over a network by the monitoring agent running on a computing device, an IP address associated with the computing device to an Internet-facing device management service configured to add the IP address to a store of organization IP addresses;

detecting, by the monitoring agent, a connection on the computing device with a second computing device, the connection designating a source IP address that is not associated with the computing device;

generating, by the monitoring agent, a connection-event notice comprising identification information for the computing device and connection information comprising the source IP address; and communicating the connection-event notice over the network to the Internet-facing device management service that identifies the computing device as Internet facing by determining the source IP address is not in the store of organization IP addresses.

15. The system of claim 14, wherein the actions further comprise classifying the source IP address as a public IP address and wherein the connection-event notice is generated in response to said classifying the source IP address as a public IP address.

16. The system of claim 14, wherein the identification information comprises a Globally Unique Identifier ("GUID") or Universally Unique Identifier ("UUID").

17. The system of claim 14, wherein the connection information comprises identification of a software application that participated in the connection.

18. The system of claim 14, wherein the identification information comprises a MAC address for the computing device.

19. The system of claim 14, wherein the connection information comprises identification of a command line that is listening on the connection.

20. The system of claim 14, wherein the connection information comprises a port on the computing device through which the connection was made.

* * * * *